(12) United States Patent
Huang

(10) Patent No.: US 8,690,502 B1
(45) Date of Patent: Apr. 8, 2014

(54) APPARATUS FOR ENGAGEMENT WITH BUCKLE

(71) Applicant: Han-Ching Huang, Taichung (TW)

(72) Inventor: Han-Ching Huang, Taichung (TW)

(*) Notice: Subject to any disclaimer, the term of this patent is extended or adjusted under 35 U.S.C. 154(b) by 0 days.

(21) Appl. No.: 13/674,074

(22) Filed: Nov. 11, 2012

(51) Int. Cl.
*B60P 7/08* (2006.01)

(52) U.S. Cl.
USPC .......................................... 410/101

(58) Field of Classification Search
USPC .......................................... 410/101, 102, 106
See application file for complete search history.

(56) References Cited

U.S. PATENT DOCUMENTS

| | | | | |
|---|---|---|---|---|
| 2,939,406 A | * | 6/1960 | Wilkoff | 410/115 |
| 3,381,925 A | * | 5/1968 | Higuchi | 410/116 |
| 3,888,190 A | * | 6/1975 | Bigge | 410/101 |
| 4,699,410 A | * | 10/1987 | Seidel | 294/215 |
| 5,752,791 A | * | 5/1998 | Ehrlich | 410/101 |
| 7,281,889 B2 | * | 10/2007 | Anderson et al. | 410/104 |
| 7,438,510 B1 | * | 10/2008 | Ledford | 410/3 |
| 8,057,142 B1 | * | 11/2011 | Alamillo | 410/101 |
| 8,079,793 B2 | * | 12/2011 | Thoma et al. | 410/112 |
| 8,439,610 B2 | * | 5/2013 | Mamie | 410/3 |
| 2008/0083860 A1 | * | 4/2008 | Neumann | 248/224.8 |

* cited by examiner

*Primary Examiner* — H Gutman

(57) ABSTRACT

A buckle-engaging apparatus includes a stationary plate, a rotational receptacle and a pivot. The stationary plate includes a central aperture defined therein. The rotational receptacle includes a rotational plate and a shell. The rotational plate includes a central aperture defined therein. The shell is attached to the rotational plate and includes a slot in a raised portion. The pivot is inserted in the central aperture of the stationary plate and the central aperture of the rotational plate to rotationally connect the rotational plate to the stationary plate.

8 Claims, 6 Drawing Sheets

APPARATUS FOR ENGAGEMENT WITH BUCKLE

BACKGROUND OF INVENTION

1. Field of Invention

The present invention relates to a strap for fastening cargo and, more particularly, to an apparatus for engagement with a buckle tied to a strap.

2. Related Prior Art

As disclosed in U.S. Pat. No. 7,438,510, an apparatus 20 for securing a pallet jack includes two brackets 22 and 34, a clip 30, a strap 40, a D-ring 44 and a cable 50. The bracket 22 is secured to a stationary object while the bracket 34 is secured to the same or another stationary object. The strap 40 is connected to the clip 30 at an end and connected to the D-ring 44 at another end. The cable 50 is connected to the D-ring 44 at an end and connected to the bracket 22 at another end. In use, the strap 40 and the cable 50 are used to wrap cargo before the clip 30 is engaged with the bracket 22 or 34. In practice, the strap 40 is twisted more or less. Such twist is however bad for the strength of the strap 40.

As disclosed in US Patent Application Publication No. 20080083860, an E-track connector 100 includes two opposite tangs 101 or 105 extending from a buckle receiver 102. The tangs 101 or 105 are secured to a stationary object. A strap 110 is tied to a buckle 114. The strap 110 is used to wrap cargo before the buckle 114 is engaged with the E-track connector 100. The strap 110 is inevitably twisted.

The present invention is therefore intended to obviate or at least alleviate the problems encountered in prior art.

SUMMARY OF INVENTION

It is the primary objective of the present invention to provide an apparatus for engagement with a buckle tied to a strap so that the strap would not be twisted.

To achieve the foregoing objective, the buckle-engaging apparatus includes a stationary plate, a rotational receptacle and a pivot. The stationary plate includes a central aperture defined therein. The rotational receptacle includes a rotational plate and a shell. The rotational plate includes a central aperture defined therein. The shell is attached to the rotational plate and includes a slot in a raised portion. The pivot is inserted in the central aperture of the stationary plate and the central aperture of the rotational plate to rotationally connect the rotational plate to the stationary plate.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
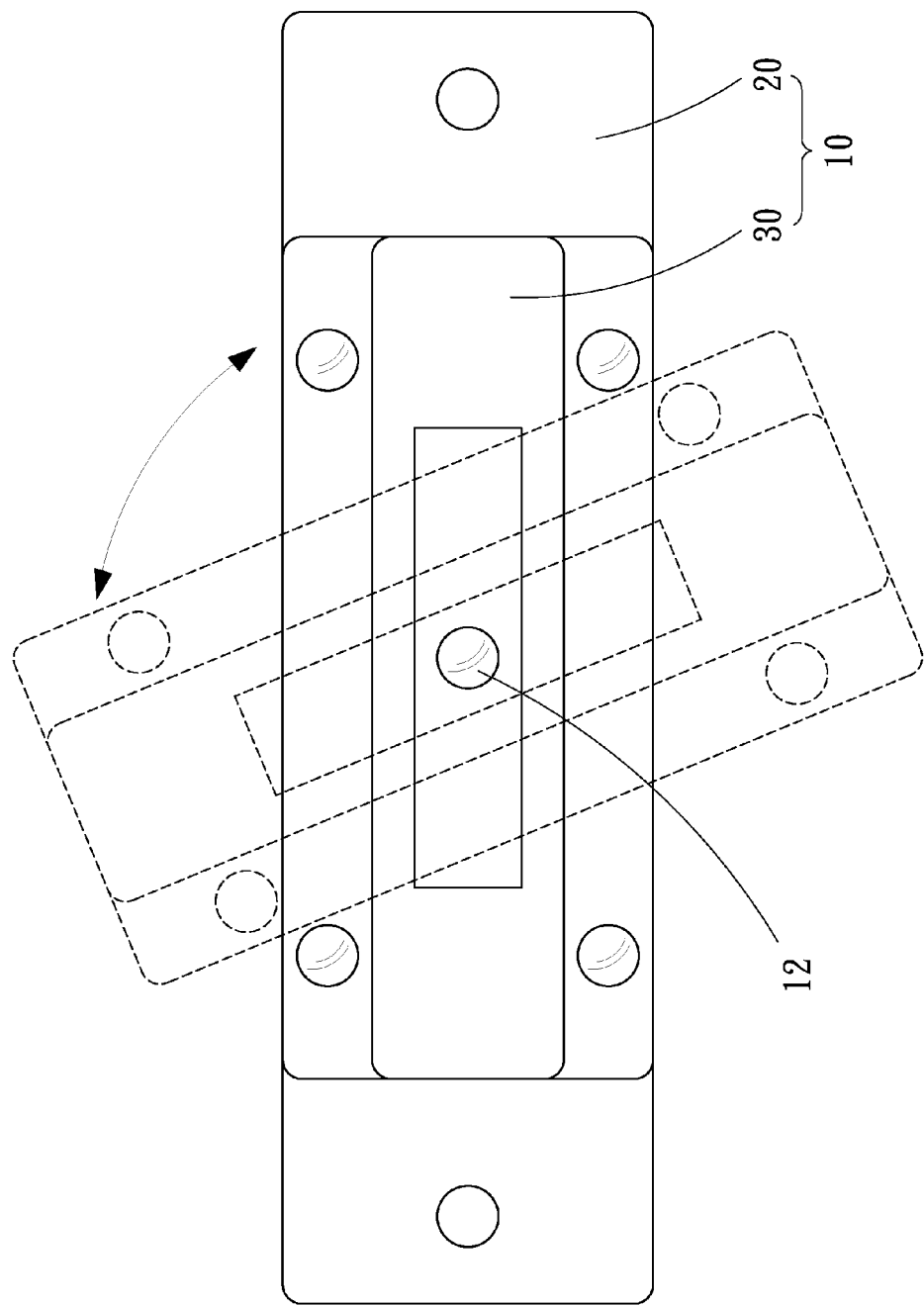
FIG. 1 is a perspective view of a buckle-engaging apparatus according to the preferred embodiment of the present invention.

Referring to FIG. 1, there is shown a buckle-engaging apparatus 10 in accordance with the preferred embodiment of the present invention. The buckle-engaging apparatus includes a pivot 12, a stationary plate 20 and a rotational receptacle 30.

Figure 2:
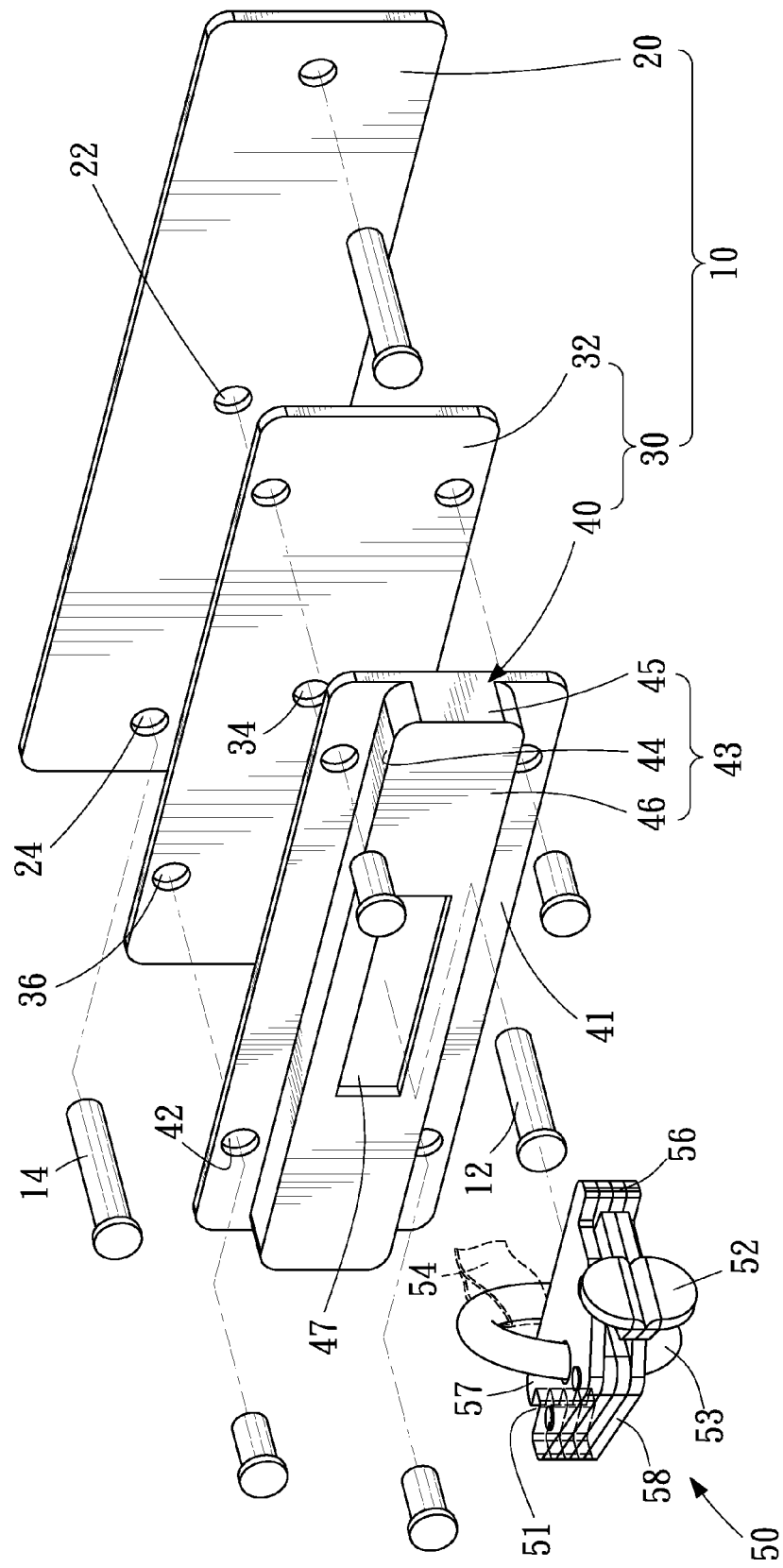
FIG. 2 is an exploded view of a buckle set and the buckle-engaging apparatus shown in FIG. 1.

Referring to FIG. 2, the stationary plate 20 is made of metal. The stationary plate 20 includes a central aperture 22 and two lateral apertures 24.

The rotational receptacle 30 includes a rotational plate 32 and a shell 40. The rotational plate 32 is made of metal. The rotational plate 32 includes a central aperture 34 and four peripheral apertures 36.

The shell 40 is made of metal. The shell 40 includes two wings 41 extending from a raised portion 43. The raised portion 43 of the shell 40 includes two long walls 44 opposite to each other, two short walls 45 between the long walls 44, and a roof 46 on the walls 44 and 45. The roof 46 includes a slot 47 defined therein. Each of the wings 41 extends from a respective one of the long walls 44. Each of the wings 41 includes two apertures 42 defined therein.

In assembly, a fastener 14 such as a rivet, pin and screw is inserted in each of the apertures 42 and a respective one of the peripheral apertures 36 so that the shell 40 is secured to the rotational plate 32. Then, pivot 12 such as a rivet, pin and screw is inserted in the central apertures 34 and 22 so that the rotational receptacle 30 is rotationally connected to the stationary plate 20.

In use, a fastener 14 is driven in a stationary object through each of the central apertures 22. Thus, the stationary plate 20 is secured to the stationary object while the rotational receptacle 30 is rotatable on the stationary plate 20.

The diagonal length of the rotational receptacle 30 is shorter than the distance of the apertures 24 from each other. Therefore, the rotation of the rotational receptacle 30 on the stationary plate 20 is not interfered with by the fasteners 14 inserted in the apertures 24.

Shown is a buckle set 50 for use with the buckle-engaging apparatus 10. The buckle set 50 includes a buckle 58, a handle 52, a ring 53 and a spring 55. The buckle 58 is made of a stack of metal strips.

Figure 3:
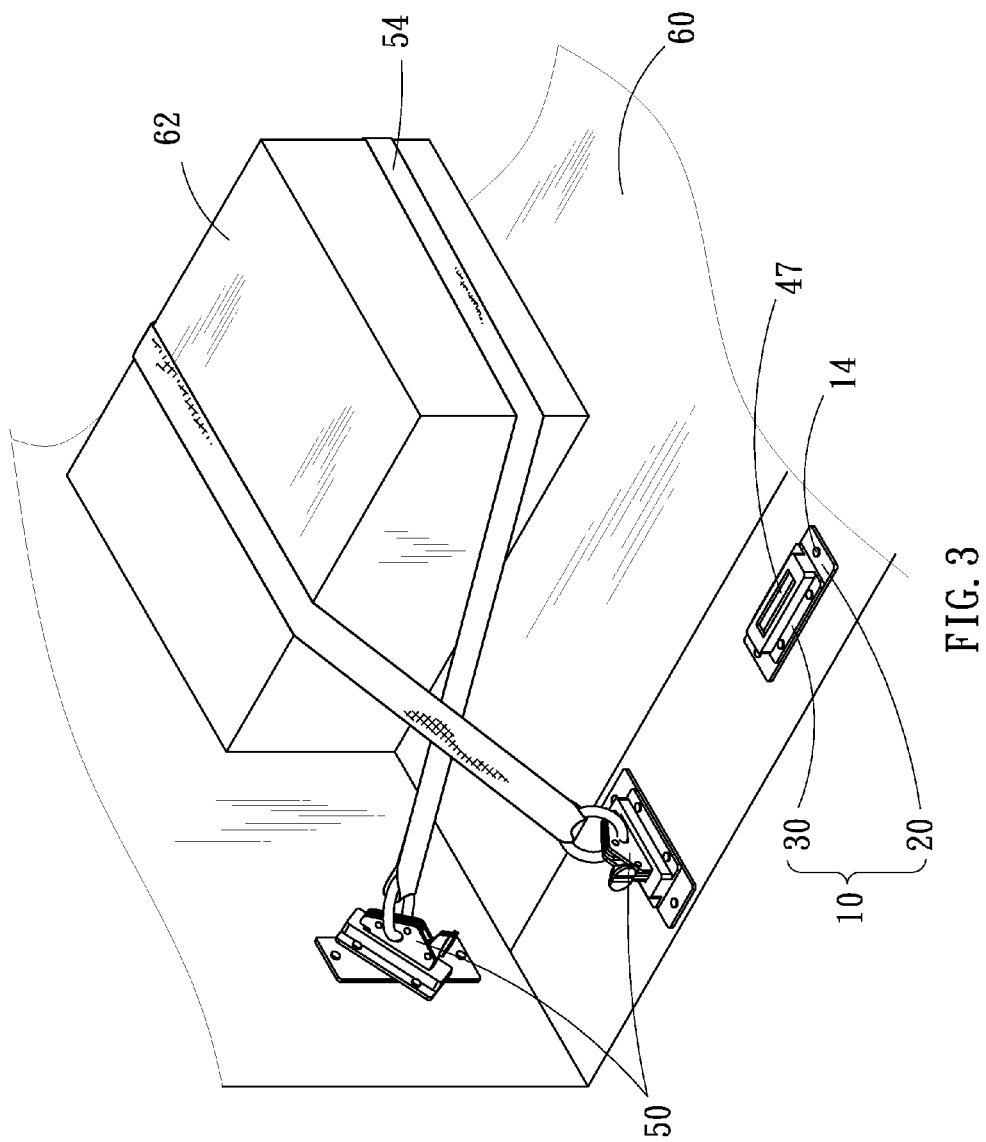
FIG. 3 is a perspective view of several buckle-engaging apparatuses as the one shown in FIG. 1.

Referring to FIG. 3, there are several buckle-engaging apparatuses 10, several buckle sets 50, and several straps 54. The number of the buckle-engaging apparatuses 10 is larger than that of the buckle sets 50. Each of the straps 54 is secured to a stationary object at an end and tied to the ring 53 of a respective one of the buckle sets 50. Each of the straps 54 is used to wrap cargo before the respective one of the buckle sets 50 is engaged with one of the buckle-engaging apparatuses 10. For each of the buckle-engaging apparatuses 10, the rotational receptacle 30 is advantageously rotatable on the stationary plate 20 to protect the straps 54 from twists.

Figure 4:
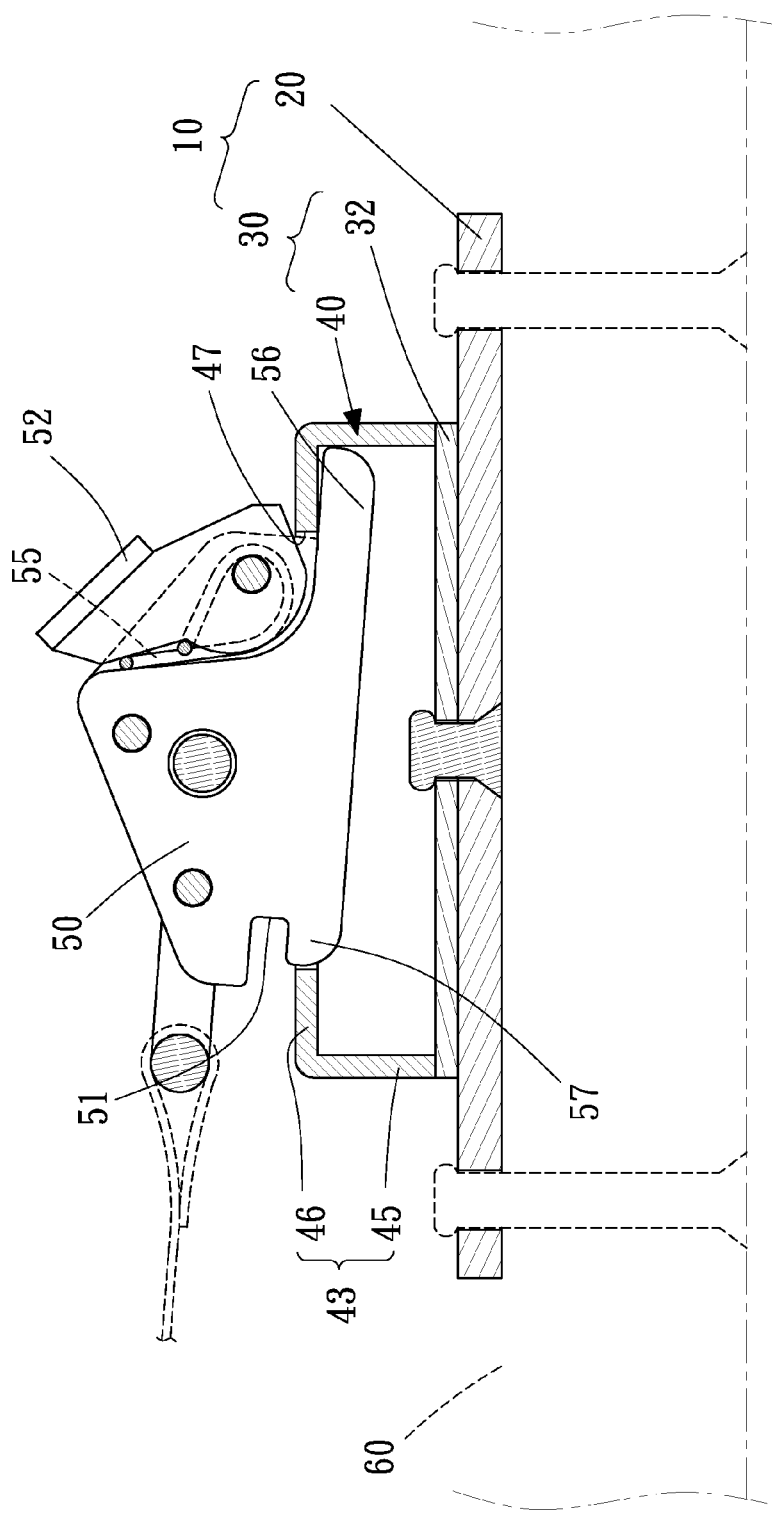
FIG. 4 is a cross-sectional view of the buckle-engaging apparatus shown in FIG. 1.
Figure 5:
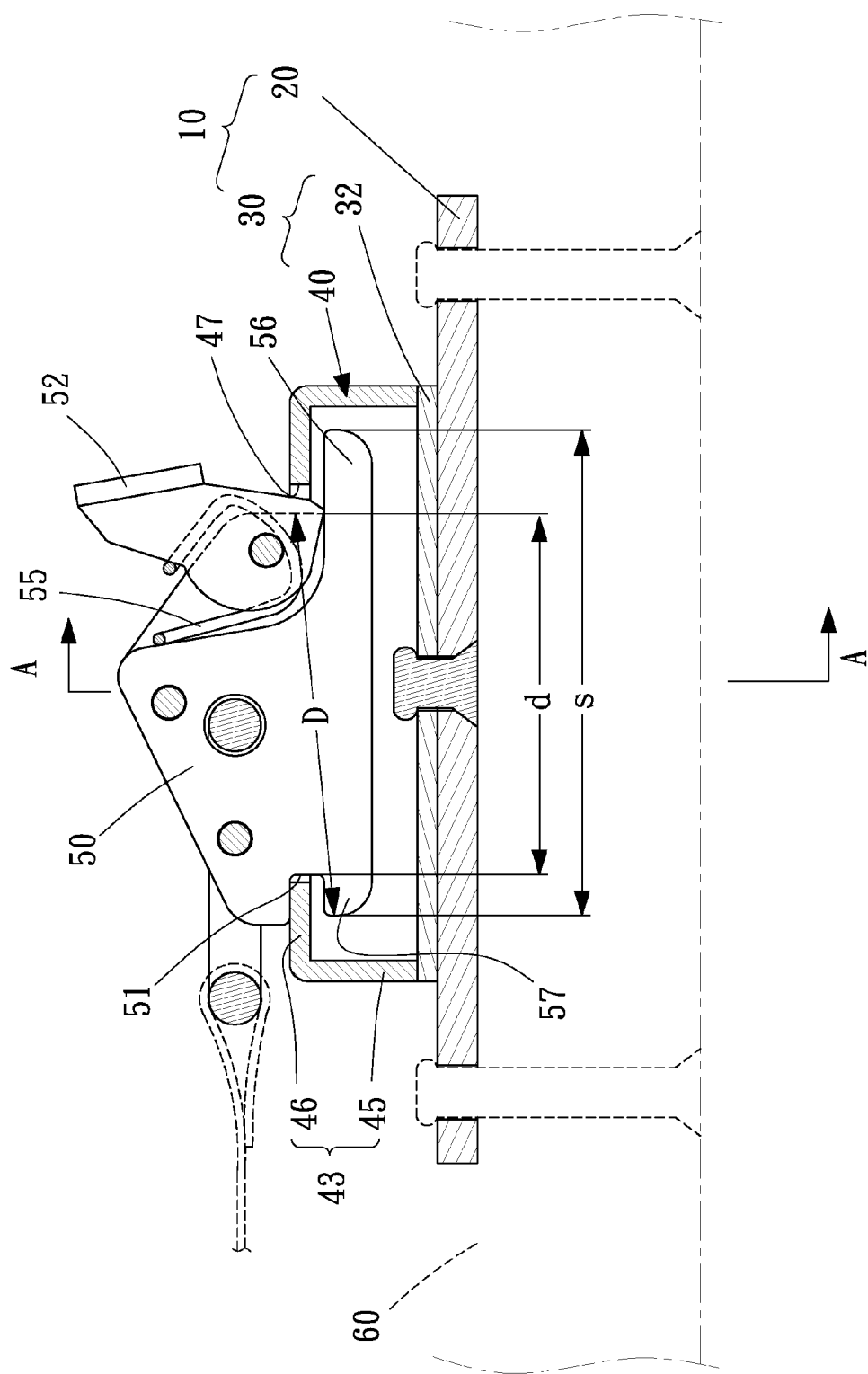
FIG. 5 is a cross-sectional view of the buckle-engaging apparatus in another position than shown in FIG. 4.

Referring to FIGS. 4 and 5, the buckle 58 includes two opposite sides. A space is defined in the first side of the buckle 58. The space is the gap between the two outermost ones of the metal strips of the buckle 58. A recess 51 is defined in the second side of the buckle 58. The buckle 58 further includes a lower right extension 56 extending from the first side below the space and a lower left extension 57 extending below the recess 51.

The handle 52 includes a button at an upper end and a cam at a lower end. The cam of the handle 52 is connected to the buckle 58 by a pin, in the space defined in the first side. The cam of the handle 52 of course includes a lobe.

The spring 55 is arranged between the handle 52 and the buckle 58. The spring 55 abuts the handle 52 to press the lobe of the cam of the handle 52 on the lower right extension 56.

The ring 53 is pivotally connected to the buckle 58. A strap is tied to the ring 53.

The tip of the lower right extension 56 is at a distance s from the tip of the lower left extension 57. A closed end of the recess 51 is at a distance d from the first side of the buckle 58. The tip of the lower left extension 57 is at a distance D from the first side of the buckle 58. The distance s is longer than the length of the slot 47. The distance D is only a little bit shorter than the length of the slot 47. The distance d is much shorter than the length of the slot 47.

Referring to FIG. 4, the handle 52 is pressed to lift the lobe of the cam of the handle 52 from the lower right extension 56 of the buckle 58. That is, there is a gap between the lobe of the cam of the handle 52 and the lower right extension 56 of the buckle 58. The lower right extension 56 of the buckle 58 is inserted in the raised portion 43 of the shell 40 via the slot 47 while a portion of the shell 40 near a right closed end of the slot 47 is placed between the lobe of the cam of the handle 52 and the lower right extension 56 of the buckle 58. The buckle 58 is pivoted to insert the lower left extension 57 of the buckle 58 in the raised portion 43 of the shell 40 via the slot 47.

Referring to FIG. 5, the handle 52 is released to allow the spring 55 to press the lobe of the cam of the handle 52 on the lower right extension 56 of the buckle 58 again. Hence, the lower portion of the buckle 58 is kept in the shell 40.

Figure 6:
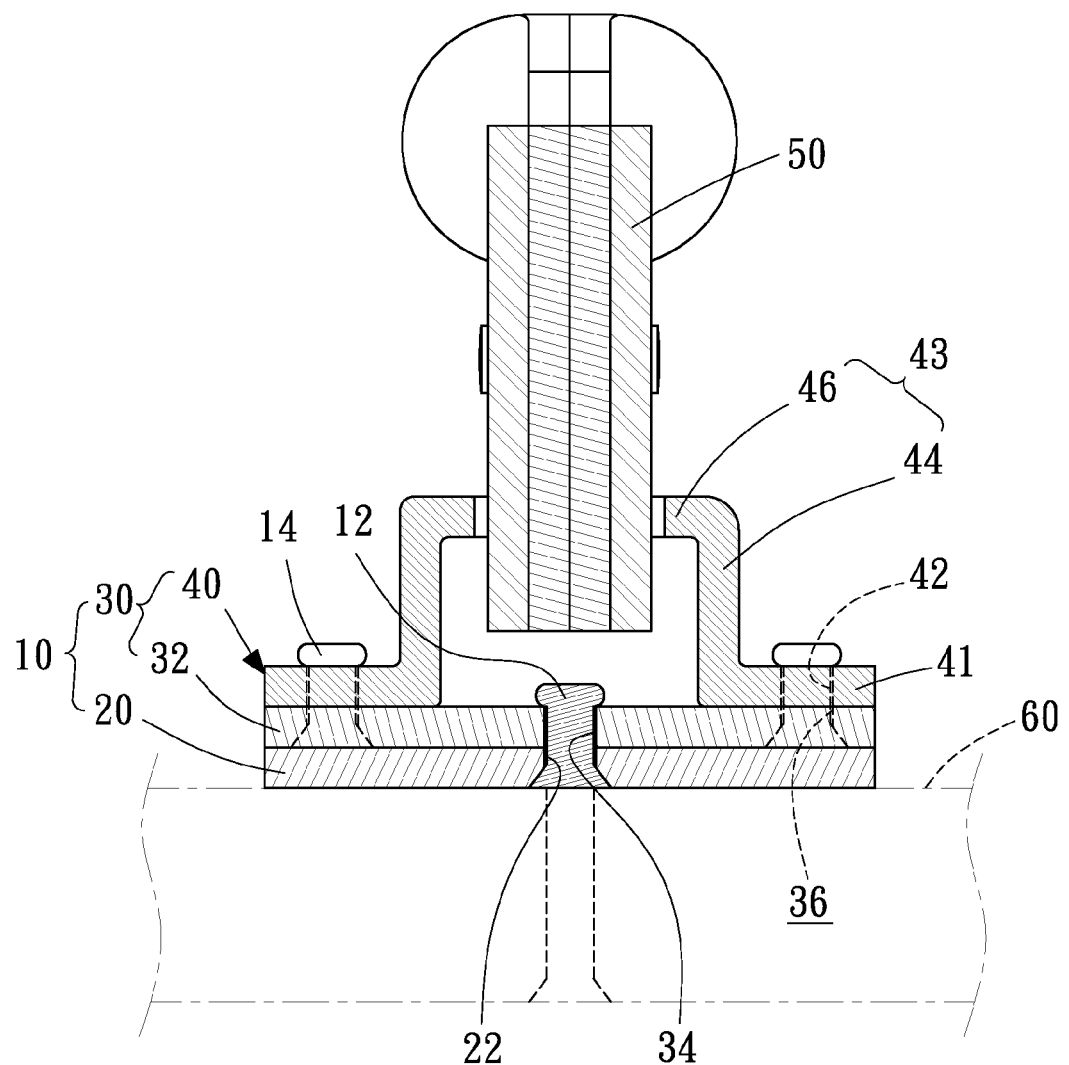
FIG. 6 is a cross-sectional view of the buckle-engaging apparatus taken along a line A-A shown in FIG. 5.

Referring to FIG. 6, the peripheral apertures 36 and the apertures 42 are preferably countersink holes. Thus, enlarged heads of the fastener 14 inserted in the peripheral apertures 36 are flush with the stationary plate 32 to render the gap between the rotational plate 32 and the stationary plate 20 small. Thus, enlarged heads of the fastener 14 inserted in the apertures 42 are flush with the wings 41 to render the gap between the wings 41 and the rotational plate 32 small.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A buckle-engaging apparatus including:
   a stationary plate including a central aperture defined therein;
   a rotational receptacle including:
      a rotational plate including a central aperture defined therein; and
      a shell attached to the rotational plate and formed with a raised portion and a slot in the raised portion; and
   a pivot inserted in the central aperture of the stationary plate and the central aperture of the rotational plate to rotationally connect the rotational plate to the stationary plate.

2. The buckle-engaging apparatus according to claim 1, wherein the shell further includes two wings extending from the raised portion, wherein the wings are attached to the rotational plate.

3. The buckle-engaging apparatus according to claim 2, wherein the raised portion of the shell includes two long walls, wherein each of the wings extends from a respective one of the long walls.

4. The buckle-engaging apparatus according to claim 3, wherein the raised portion of the shell includes two opposite short walls formed between the long walls.

5. The buckle-engaging apparatus according to claim 4, wherein the raised portion of the shell includes a roof formed on the long and short walls.

6. The buckle-engaging apparatus according to claim 5, wherein the slot is defined in the roof.

7. The buckle-engaging apparatus according to claim 1, wherein the pivot is a rivet with two enlarged heads each formed at an end.

8. The buckle-engaging apparatus according to claim 1, further includes at least one fastener for securing the shell to the rotational plate.

* * * * *